United States Patent [19]

Winquist

[11] 3,933,974

[45] Jan. 20, 1976

[54] PROCESS FOR THE PREPARATION OF FERRIERITE

[75] Inventor: Bruce H. C. Winquist, Houston, Tex.

[73] Assignee: Shell Oil Company, Houston, Tex.

[22] Filed: Feb. 18, 1975

[21] Appl. No.: 550,307

[52] U.S. Cl. ............... 423/118; 423/329; 252/455 Z
[51] Int. Cl.² ......................................... C01B 33/28
[58] Field of Search ........... 423/329, 328, 330, 118; 252/455 Z

[56] References Cited
UNITED STATES PATENTS 3,758,667  9/1973  Kouwenhoven et al. ........... 423/118

OTHER PUBLICATIONS

Barrer et al., "Chemical Society Journal," 1964, Part I, pp. 485–497.
Barrer et al., "The American Mineralogist," Vol. 50, 1965, pp. 484–489.
Wise et al., "The American Mineralogist," Vol. 54, 1969, pp. 887–895.
Kibby et al., "Journal of Catalysis," Vol. 35, Nov. 1974, pp. 256–272.

*Primary Examiner*—Edward J. Meros
*Attorney, Agent, or Firm*—Ronald R. Reper

[57] ABSTRACT

Ferrierite is prepared by maintaining at a temperature from about 170° to 215°C an aqueous mixture of amorphous silica-alumina and sodium and potassium compounds wherein from about 65 to about 90 mol % of the alkali metal as $X_2O$ wherein X represents Na and K originates from salts of at least one polybasic acid having a pK value greater than 10° at 18°C for the highest dissociation step, and the molar fraction of potassium to total sodium and potassium content is from about 10 to 45%, until ferrierite crystals are formed.

10 Claims, No Drawings

PROCESS FOR THE PREPARATION OF FERRIERITE

BACKGROUND OF THE INVENTION

This invention relates to a method for preparing ferrierite; more particularly, the invention relates to a method of crystallizing ferrierite at relatively low temperatures from reaction mixtures having compositions within specified ranges.

Crystalline alumino-silicates such as ferrierite in naturally occurring and synthetic forms have been shown to have catalytic capabilities for hydrocarbon conversion and highly selective adsorption properties.

These crystalline materials exhibit ordered structures having passages, cavities, or pores of definite ranges of sizes, characteristic for each variety. Such materials have been referred to as "molecular sieves" since the dimensions of the pores are such as to preferentially adsorb molecules of certain dimensions while rejecting those of larger dimension.

Ferrierite is the preferred crystalline alumino-silicate product of the method of the present invention. It is a naturally occuring zeolite mineral having a composition varying somewhat with the particular source. A typical elemental composition has been reported (D. W. Breck, Zeolite Molecular Sieves, John Wiley & Sons, 1974, p219) to have a composition corresponding to the formula: $Na_{1.5}Mg_2[(AlO_2)_{5.5}(SiO_2)_{30.5}] \cdot 18H_2O$.

The prominent structural features of ferrierite have been found by X-ray crystal determination to be parallel channels in the alumino-silicate framework. These channels, which are roughly elliptical in cross section, are of two sizes: larger channels having major and minor axes of 5.5 and 4.3A respectively, and smaller parallel channels having major and minor axes of 4.8 and 3.4A, respectively. Generally speaking ferrierite adsorbs molecules small enough to penetrate the channels of its porous structure, such as e.g. lower normal paraffin hydrocarbons such as methane, ethane, and in it's hydrogen form larger molecules such as propane, n-hexane and n-octane. Both alkali metal and hydrogen forms reject branched chain and cyclic hydrocarbon molecules.

Synthesis of ferrierite has been reported by Coombs et al, Geochimica Cosmochimica Acta Vol 17 P53 et seq (1959); Barrer et al, Journal Chemical Society, 1964, p485 et seq; Hawkins, Materials Research Bulletin; Vol 2 p951 et seq (1967) and Kibby et al, Journal of Catalysis, Vol 35 p256 et seq (1974). A disadvantage of these procedures is that relatively high reaction temperatures of about 300° to 400°C are employed; these high temperatures generate high pressures and require expensive process equipment.

An element of the instant invention is the use of sodium and potassium salts of certain polybasic acids. The use of sodium salts of polybasic acids in the preparation of another aluminosilicate, mordenite, is known from U.S. Pat. No. 3,758,667.

SUMMARY OF THE INVENTION

According to this invention, a simple low temperature method has been found for the production of crystalline ferrierite employing aqueous mixtures of certain amounts of potassium salts together with certain amounts of sodium salts and amorphous silica-alumina at temperatures from about 170°–215°C.

The invention provides a method for the preparation of ferrierite which comprises maintaining at a temperature from about 170° to 215°C an aqueous starting mixture of amorphous silica-alumina having a silica/alumina mole ratio from about 9 to about 25 and a mixture of sodium and potassium compounds until ferrierite crystals are formed, provided that: the amount of total sodium and potassium concentration in the starting mixture expressed as $Na_2O + K_2O = X_2O$ when expressed as the molar ratio $X_2O/Al_2O_3$ is from about 2.5 to about 7.5; provided that from about 65 mol % to about 90 mol %, and preferably from about 70 to about 85 mol % of the total sodium and potassium present in the starting mixture expressed is $X_2O$ originates from sodium and/or potassium salts of polybasic acids having a pK value greater than 10° at 18°C for the highest dissociation step; that the potassium ion fraction is from about 0.1 to about 0.45; and the molar ratio $H_2O/Al_2O_3$ is from about 225 to about 315.

DETAILED DESCRIPTION OF THE INVENTION

According to the invention, ferrierite forms in compositions containing both potassium and sodium ions. The amount of potassium required is conveniently expressed in terms of a "potassium ion fraction" which is the potassium ion content expressed in moles divided by the total sodium and potassium ion content expressed in moles i.e. $K/(Na + K)$. It has been found that the absence of potassium and the presence of only low potassium fractions results in the formation of mordenite as principal product. At high potassium fractions, adularia, $KAlSi_3O_8$, is formed. When only potassium is present, adularia is the sole product. The use of other alkali metals such as lithium, rubidium and cesium in place of potassium in the starting mixture has been found to not result in significant amounts of ferrierite.

The potassium ion fraction in the starting mixture according to the invention can vary from about 0.1 to about 0.45, and preferably from 0.15 to about 0.40. The precise limits within the range will vary somewhat with the ratio of silica to the amount of alumina present. For example in a starting mixture of the sodium phosphate, potassium fluoride and amorphous silica-alumina having a silica to alumina mole ratio of 11, a potassium ion fraction from about 0.11 to 0.32 may be used. When employing silica-aluminas having a higher silica to alumina ratio e.g. about 20 potassium ion fractions of about 0.40 have resulted in high purity ferrierite.

Sodium and potassium salts suitable for the preparation of ferrierite according to the invention include salts of both inorganic acids and organic acids, provided that these acids have a pK value larger than 10 for their highest dissociation step measured at 18°C. Examples of suitable inorganic acids are arsenic acid, carbonic acid, telluric acid and ortho-phosphoric acids. Exemplary organic acids include orthohydroxybenzoic acid and ascorbic acid. It was found that when the sodium salt of e.g. citric acid was employed in the starting mixture no ferrierite was produced. Preferred salts include the sodium and potassium phosphates, particularly $Na_3PO_4$ and $K_3PO_4$.

The starting mixture comprising amorphous silica-alumina, water and sodium and potassium salts as described above must also contain minor amounts of other sodium and potassium compounds, provided however that from about 65 mol % to about 90 mol % and preferably from about 70 mol % to about 85 mol % of the alkali metals present expressed as $X_2O$, wherein X represents sodium and potassium originates from salts of the above described polybasic acids. Examples of the other compounds which must be present in minor amounts include e.g. sodium or potassium salts of moderate or strong inorganic acids, i.e. halides such as sodium chloride or potassium fluoride; nitrates, chromates, thiocyanates, molybdates and the like. Potassium and sodium fluoride have been found particularly suitable. Although small amounts of strongly basic compounds such as hydroxides can be tolerated, it is necessary that the pH of the starting mixtures be from about 10.3 to about 11.8 and preferably from about 10.5 to about 11.5. The total sodium and potassium content of the starting mixture expressed as $X_2O$ within which ferrierite forms can vary within relatively narrow limits of from about 2.5 to about 7.5 mols per mole of alumina, and preferably is from about 3.5 to about 6.5 mols per mole of alumina.

The amount of water present in the starting mixture has been found to be critical with the limits from about 225 to about 315 mols of water for each mole of alumina present therein, and preferably is from about 240 to about 300 mols of water per mole of alumina to obtain highest purity ferrierite.

The amorphous silica-alumina may have a silica/alumina molar ratio from about 9 to about 25 and preferably has a molar ratio from about 10 to about 24. The amorphous silica-alumina is preferably a cogel of aluminum hydroxide on silica hydrogel. The term "cogel" herein refers to an amorphous silica-alumina obtained by precipitating an aluminum hydroxide gel together with or onto a silica hydrogel. The amorphous silica-alumina may very suitably be a commercial silica-alumina cracking catalyst with a low alumina content. Preferred are cracking catalysts having an alumina content from about 11 to about 15 % w.

The preparation of ferrierite according to the invention is a hydrothermal process carried out by maintaining the starting mixture critically at a temperature from about 170° to 215°C and preferably from about 175° to 210°C for sufficient time for the ferrierite to crystallize. Preferably the process is carried out at autogenous pressures. During the preparation, the reaction mixture is preferably agitated, for example by stirring or shaking. Typically time required for completion of crystallization without seeding is about 60 hours or more at e.g. 210°C. With seeding shorter times may be required.

After formation of the ferrierite, the crystals are separated from the mother liquor by any convenient solid-liquid separation technique such as for example filtration, decanting, centrifuging and the like. The separated crystals are then washed with water and dried at an elevated temperature e.g. within the range of 100°–200°C.

Ferrierite prepared according to the invention may be used for various applications, such as an adsorbent, as a molecular sieve for the separation of gases or hydrocarbon mixtures, as a catalyst carrier and the like. For use as a catalyst carrier the ferrierite may be mixed with an inert binder and shaped into particles of desired shape or size. Exemplary binders include natural clays such as bentonite and kaolin as well as synthetic inorganic oxides such as alumina, silica, zirconia, boria, and mixtures of these.

The following examples will serve to further illustrate the invention:

EXAMPLE I

This example illustrates the effect of water content on crystalline products. Seven reaction mixtures of the molar composition $2.07\ Na_3PO_4 \cdot 1.74\ KF \cdot 11SiO_2 \cdot Al_2O_3 \cdot XH_2O$ prepared by dissolving $Na_3PO_4 \cdot 12H_2O$ in the required amount of water, followed by addition of anhydrous potassium fluoride with stirring until dissolved and finally the addition of a commercially available low alumina fluid cracking catalyst comprising (13.3% w $Al_2O_3$, 86.7% w $SiO_2$ dry basis), as amorphous silica-alumina. The starting mixture was stirred until the silica-alumina was well dispersed and was then sealed in an autoclave and maintained at 210°C for 65 hours with agitation. The solid product was recovered by filtration, washed with 6 to 8 liters of deionized water, and was dried at 120°C. The composition of the products was established with the aid of X-ray analysis. The molar compositions and results of these experiments are summarized in Table I.

TABLE I

| EXP NO | Molar Composition | | | | | Products |
|---|---|---|---|---|---|---|
|  | $Na_3PO_4$ | KF | $SiO_2$ | $Al_2O_3$ | $H_2O$ |  |
| 1 | 2.07 | 1.74 | 11.0 | 1.0 | 150 | Ferrierite, with significant amounts of Mordenite, Adularia |
| 2 | 2.07 | 1.74 | 11.0 | 1.0 | 200 | Ferrierite, Mordenite, Adularia |
| 3 | 2.07 | 1.74 | 11.0 | 1.0 | 246 | Ferrierite |
| 4 | 2.07 | 1.74 | 11.0 | 1.0 | 275 | Ferrierite |
| 5 | 2.07 | 1.74 | 11.0 | 1.0 | 300 | Ferrierite |
| 6 | 2.07 | 1.74 | 11.0 | 1.0 | 325 | Mostly amorphorus material, some Ferrierite |
| 7 | 2.07 | 1.74 | 11.0 | 1.0 | 350 | Mostly amorphous material, some Ferrierite |

It may be seen that although ferrierite was produced at water concentrations of 150–350 moles per mole of alumina, highest purity ferrierite was produced when the amount of water is from about 240 to about 300 moles of water per mole of alumina.

EXAMPLE II

This example illustrates the effect of sodium and potassium content on crystalline products. Eight mixtures of the molar composition $2.07\ Na_3PO_4 \cdot XKF \cdot 11SiO_2 \cdot Al_2O_3 \cdot 246H_2O$ were prepared according to the procedure of Example I with varying amounts of potassium salt as shown in the table below. In addition two starting mixtures were prepared according to the above procedure, except that amorphous silica-aluminas having a silica/alumina mole ratio of 18.4 to 1 and 20.4 to 1, respectively were used. These mixtures too were heated at 210°C in rolling autoclaves for 65 hours. Molar compositions and results of these experiments are summarized in Table II.

TABLE II

| Exp No. | Molar Composition | | | | | Potassium Ion Fraction | Products |
| --- | --- | --- | --- | --- | --- | --- | --- |
| | $Na_3PO_4$ | KF | $SiO_2$ | $Al_2O_3$ | $H_2O$ | | |
| 8 | 2.07 | 0 | 11.0 | 1 | 246 | 0 | Mordenite |
| 9 | 2.07 | 0.78 | 11.0 | 1 | 246 | 0.11 | Mordenite, Ferrierite |
| 10 | 2.07 | 1.55 | 11.0 | 1 | 246 | 0.20 | Ferrierite |
| 11 | 2.07 | 1.74 | 11.0 | 1 | 246 | 0.22 | Ferrierite |
| 12 | 2.07 | 1.94 | 11.0 | 1 | 246 | 0.24 | Ferrierite |
| 13 | 2.07 | 2.13 | 11.0 | 1 | 246 | 0.26 | Ferrierite |
| 14 | 2.07 | 2.32 | 11.0 | 1 | 246 | 0.27 | Ferrierite |
| 15 | 2.07 | 3.0 | 18.4 | 1 | 246 | 0.33 | Ferrierite |
| 16 | 2.07 | 4.0 | 20.4 | 1 | 246 | 0.39 | Ferrierite |
| 17 | 2.07 | 3.87 | 11.0 | 1 | 246 | 0.38 | Ferrierite, Adularia |

As may be seen ferrierite is produced when the potassium ion fraction varies from about 0.1 to about 0.45, preferably from about 0.15 to about 0.40; the precise limits varying with silica-alumina ratio.

EXAMPLE III

To determine the necessity for the presence of potassium ions in the starting mixture a series of four mixtures containing only sodium ions were tested according to the procedure of Example I. These mixtures which had the molar composition 2.07 $Na_3PO_4$ . 1.55–6.0 NaF . 11$SiO_2$ . $Al_2O_3$ . 246$H_2O$ after 65 hours at 210°C failed to produce any significant amount of ferrierite; the product was essentially mordenite.

EXAMPLE IV

To determine the necessity for the presence of sodium ion in the starting mixture, a starting mixture containing only potassium ions was tested according to the procedure of Example I. The mixture which had the molar composition 2.07 $K_3PO_4$ . 11$SiO_2$ . $Al_2O_3$ . 246$H_2O$ after 65 hours at 210°C failed to produce any significant amount of ferrierite; the product was essentially amorphous.

EXAMPLE V

The procedure of Example IV was repeated except that the starting mixture additionally contained two moles of potassium fluoride. Again the starting mixture containing only potassium ions failed to produce any significant amount of ferrierite; the product was essentially adularia.

EXAMPLE VI

To investigate crystallization of ferrierite from compositions with varying silica/alumina ratios a series of amorphous silica-alumina gels was prepared by dissolving sodium aluminate ($Na_2O$ . $Al_2O_3$ . 3$H_2O$, "Purified" grade available from Fisher Scientific Co.) in water, then adding the required amount of silica source. Gels were prepared using either sodium silicate solutions ("N" solution available from Philadelphia Quartz Co.), or colloidal silica (Ludox SM-30, Du Pont). The mixture of sodium aluminate and silica source was heated with stirring for 1–2 hours, filtered, washed with deionized $H_2O$ and heated for an additional hour in one molar $NH_4Cl$ solution to obtain the ammonium form of gel. The gel was separated from the mother liquor by filtration, washed with deionized water, dried at 120°C, crushed to finer than 20 mesh, and calcined at 500°C.

Sixteen mixtures of the molar composition 2.07 $Na_3PO_4$ . XKF . X$SiO_2$ . $Al_2O_3$ . 246$H_2O$ were prepared according to the procedure of Example I with varying amounts of potassium salt and employing in place of the cracking catalyst the amorphous silica-alumina prepared according to the above procedure. These mixtures too were heated at 210°C in rolling autoclaves for 65 hours. Molar compositions and results of these experiments are summarized in Table III.

TABLE III

| Exp No | Molar Composition | | | | | Products |
| --- | --- | --- | --- | --- | --- | --- |
| | $Na_3PO_4$ | KF | $SiO_2$ | $Al_2O_3$ | $H_2O$ | |
| 26 | 2.07 | 1.0 | 7.2 | 1.0 | 246 | Adularia |
| 27 | 2.07 | 1.0 | 11.4 | 1.0 | 246 | Ferrierite |
| 28 | 2.07 | 1.0 | 21.0 | 1.0 | 246 | Ferrierite |
| 29 | 2.07 | 1.0 | 24.1 | 1.0 | 246 | Ferrierite, Mordenite |
| 30 | 2.07 | 2.3 | 7.2 | 1.0 | 246 | Adularia |
| 31 | 2.07 | 2.3 | 11.4 | 1.0 | 246 | Ferrierite, Mordenite |
| 32 | 2.07 | 2.3 | 21.0 | 1.0 | 246 | Ferrierite |
| 33 | 2.07 | 2.3 | 24.1 | 1.0 | 246 | Amorphous |
| 34 | 2.07 | 3.0 | 7.2 | 1.0 | 246 | Adularia |
| 35 | 2.07 | 3.0 | 12.2 | 1.0 | 246 | Ferrierite |
| 36 | 2.07 | 3.0 | 21.0 | 1.0 | 246 | Ferrierite |
| 37 | 2.07 | 3.0 | 24.1 | 1.0 | 246 | Ferrierite |
| 38 | 2.07 | 4.0 | 7.2 | 1.0 | 246 | Adularia |
| 39 | 2.07 | 4.0 | 11.4 | 1.0 | 246 | Adularia |
| 40 | 2.07 | 4.0 | 21.0 | 1.0 | 246 | Ferrierite, Adularia, Mordenite |
| 41 | 2.07 | 4.0 | 24.1 | 1.0 | 246 | Ferrierite, Adularia, Mordenite |

EXAMPLE VII

To determine the effect of crystallization temperature the starting mixtures prepared according to the general procedure of Example I and having the various compositions shown below in Table IV were heated at the temperature shown in the table in stirred or rolling autoclaves for a time varying from about 65 to 90 hours; results of the experiments are summarized in Table IV.

TABLE IV

| Exp No | K$_3$PO$_4$ | Na$_3$PO$_4$ | KF | SiO$_2$ | Al$_2$O$_3$ | H$_2$O | Temperature °C | Products |
|---|---|---|---|---|---|---|---|---|
| 42 | — | 4.0 | 1.94 | 11.0 | 1.0 | 246 | 100 | Mordenite |
| 43 | — | 2.07 | 1.94 | 11.0 | 1.0 | 246 | 135 | Amorphous Material |
| 44 | — | 2.30 | 1.94 | 11.0 | 1.0 | 246 | 165 | Amorphous Material |
| 45 | — | 2.30 | 2.32 | 11.0 | 1.0 | 246 | 175 | Mostly Amorphous material, some Ferrierite |
| 46 | 0.41 | 1.66 | 1.94 | 11.0 | 1.0 | 246 | 175 | Ferrierite |
| 47 | — | 2.07 | 1.74 | 11.0 | 1.0 | 246 | 195 | Ferrierite |
| 48 | — | 2.07 | 1.94 | 11.0 | 1.0 | 300 | 200 | Ferrierite |
| 49 | — | 2.07 | 1.74 | 11.0 | 1.0 | 289 | 210 | Ferrierite |
| 50 | — | 2.07 | 1.94 | 11.0 | 1.0 | 246 | 225 | Mordenite, Adularia |
| 51 | — | 2.07 | 1.94 | 11.0 | 1.0 | 246 | 250 | Adularia, Mordenite |

Of the experiments 42–51, only experiments 45–49 are according to the present invention. The other experiments are given for comparison.

What is claimed is:

1. A method for the preparation of ferrierite which comprises maintaining at a temperature from about 170° to about 215°C an aqueous starting mixture of amorphous silica-alumina having a silica/alumina ratio from about 9 to about 25 and a mixture of sodium and potassium compounds until ferrierite crystals are formed, provided that in the starting mixture:
   a. the amount of total sodium and potassium concentration expressed as Na$_2$O + K$_2$O = X$_2$O, when expressed as the molar ratio X$_2$O/Al$_2$O$_3$ is from about 2.5 to about 7.5;
   b. from about 65 to about 90 mol % of the total sodium and potassium, expressed as X$_2$O, originates from sodium and/or potassium salts of polybasic acids having a pK value greater than 10° at 18°C for the highest dissociation step;
   c. the potassium ion fraction is from about 0.1 to about 0.45; and
   d. the molar ratio H$_2$O/Al$_2$O$_3$ is from about 225 to about 315.

2. A method as in claim 1 wherein the amorphous silica-alumina has a silica/alumina molar ratio from about 10 to about 24.

3. A method as in claim 1 wherein the total sodium and potassium concentration expressed as X$_2$O/Al$_2$O$_3$ is from about 3.5 to about 6.5.

4. A method as in claim 1 wherein from about 70 to about 85 mol % of the total sodium and potassium present in the starting mixture expressed as X$_2$O originates from sodium or potassium salts of polybasic acids having pK value greater than 10° at 18°C for the highest dissociation step.

5. The method of claim 1 wherein the potassium ion fraction is from about 0.15 to about 0.40.

6. The method of claim 1 wherein the molar ratio H$_2$O/Al$_2$O$_3$ is from about 240 to about 300.

7. The method of claim 1 wherein the temperature is from about 175°C to about 210°C.

8. The method of claim 1 wherein the silica-alumina is a commercial cracking catalyst with low alumina content.

9. The method of claim 1 wherein at least one of the sodium and potassium salts of polybasic acids are salts of phosphoric or carbonic acid.

10. The method of claim 1 wherein the starting mixture is agitated during the preparation.